(12) United States Patent
Murray et al.

(10) Patent No.: US 11,092,064 B2
(45) Date of Patent: Aug. 17, 2021

(54) VEHICULAR THERMAL MANAGEMENT SYSTEM ARRANGEMENT

(71) Applicant: Schaeffler Technologies AG & Co. KG, Herzogenaurach (DE)

(72) Inventors: Michael Murray, Commerce Township, MI (US); Peter Brazas, Royal Oak, MI (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 16/798,594

(22) Filed: Feb. 24, 2020

(65) Prior Publication Data

US 2020/0271043 A1 Aug. 27, 2020

Related U.S. Application Data

(60) Provisional application No. 62/812,677, filed on Mar. 1, 2019, provisional application No. 62/810,045, filed on Feb. 25, 2019.

(51) Int. Cl.
| | |
|---|---|
| *F01P 3/18* | (2006.01) |
| *F01P 11/08* | (2006.01) |
| *F01P 7/16* | (2006.01) |
| *F01N 3/04* | (2006.01) |
| *F01P 5/10* | (2006.01) |
| *F01N 5/02* | (2006.01) |
| *F01P 7/14* | (2006.01) |

(52) U.S. Cl.
CPC ............. *F01P 3/18* (2013.01); *F01N 3/046* (2013.01); *F01N 5/02* (2013.01); *F01P 5/10* (2013.01); *F01P 7/16* (2013.01); *F01P 11/08* (2013.01); *F01P 2003/187* (2013.01); *F01P 2007/146* (2013.01)

(58) Field of Classification Search
CPC ........ F01P 3/18; F01P 5/10; F01P 7/16; F01P 11/08; F01P 2003/187; F01P 2007/146; F01P 11/04; F01P 2003/182; F01N 3/046; F01N 5/02
See application file for complete search history.

(56) References Cited

U.S. PATENT DOCUMENTS

| | | |
|---|---|---|
| 6,427,640 B1 | 8/2002 | Hickey et al. |
| 9,188,051 B1 | 11/2015 | Zahdeh et al. |
| 2007/0209610 A1 | 9/2007 | Bradley et al. |
| 2007/0227474 A1 | 10/2007 | Kanig et al. |
| 2012/0102952 A1 | 5/2012 | Spohn et al. |
| 2013/0186061 A1* | 7/2013 | Jarzombek .............. F01N 3/046 60/273 |
| 2013/0305708 A1 | 11/2013 | Zahdeh et al. |
| 2016/0186648 A1* | 6/2016 | Rollinger .............. B60W 10/00 123/41.15 |
| 2017/0248065 A1* | 8/2017 | Liu ......................... F02B 37/00 |
| 2018/0371982 A1 | 12/2018 | Bilancia et al. |

FOREIGN PATENT DOCUMENTS

DE 10302170 A1 8/2004

* cited by examiner

*Primary Examiner* — Jacob M Amick
(74) *Attorney, Agent, or Firm* — Matthew Evans (57) ABSTRACT

A vehicular thermal management system is provided that includes an internal combustion engine, a heat recoverer, an engine oil heat exchanger, a drivetrain oil heat exchanger, a coolant pump, and a coolant circuit that fluidly connects the preceding components. The drivetrain oil heat exchanger and the engine oil heat exchanger are arranged in series within the coolant circuit.

18 Claims, 8 Drawing Sheets

VEHICULAR THERMAL MANAGEMENT SYSTEM ARRANGEMENT

CROSS-REFERENCE TO RELATED APPLICATIONS

This application claims the benefit of U.S. Provisional Patent Application No. 62/810,045 filed Feb. 25, 2019 and U.S. Provisional Patent Application No. 62/812,677 filed Mar. 1, 2019, the disclosures of which are incorporated in their entirety by reference herein.

TECHNICAL FIELD

This disclosure is generally related to vehicular thermal management systems and arrangements thereof, and, more, particularly, to vehicles that utilize an internal combustion (IC) engine.

BACKGROUND

Vehicular thermal management systems can utilize heat generated from an IC engine to improve powertrain system or component efficiency. Heating of a lubricating fluid within vehicular powertrain components can reduce viscosity and resultant operating friction, leading to efficiency gains.

SUMMARY

An example embodiment of a vehicular thermal management system is provided that includes an IC engine, a heat recoverer, an engine oil heat exchanger (EOHX), a drivetrain oil heat exchanger (DOHX), a coolant pump, and a coolant circuit that fluidly connects these components. The DOHX and the EOHX are arranged in series within the coolant circuit. The EOHX can be arranged to receive an exiting coolant from the DOHX, and the DOHX can be arranged upstream of the EOHX within the coolant circuit.

Examples of the heat recoverer include, but are not limited to, an integrated exhaust manifold within a cylinder head of the IC engine, an exhaust gas recoverer, or any other heat recovering device for an IC engine.

The vehicular thermal management system can include a first coolant control valve (CCV) that is arranged between the coolant pump and the DOHX, with the first CCV configured to control a temperature of a coolant delivered to the DOHX. The first CCV can include a continuously variable single-lobe rotary valve body (RVB).

The vehicular thermal management system can include a second CCV that is arranged to variable adjust a coolant flow of the IC engine. The second CCV can include a continuously variable multi-lobe RVB.

An example embodiment of a vehicular thermal management system includes an IC engine, a heat recoverer, an EOHX, a DOHX, a coolant pump, a coolant circuit that fluidly connects these components, and a first CCV. The first CCV is configured to receive and variably adjust a cooled coolant flow, defining a first exited coolant flow that mixes, at a fluid terminal located downstream of the first coolant control valve, with a second exited coolant flow of the heat recoverer, defining a mixed coolant flow that exits the fluid terminal and is delivered to the DOHX.

The vehicular thermal management system can include a second CCV arranged to variably adjust coolant flow within the IC engine. One or both of the first and second CCVs can be continuously variable.

The vehicular thermal management system can include a fixed-opening flow adjuster that is arranged between the heat recoverer and the fluid terminal. The term "fixed-opening" is meant to signify an opening that can not be adjusted, such as a flow orifice.

An example embodiment of a vehicular thermal management system includes a coolant circuit having a first coolant branch, a second coolant branch, and a third coolant branch. The first coolant branch includes a DOHX and an EOHX arranged in series, with the DOHX arranged upstream of the EOHX. The second coolant branch includes an IC engine. The third coolant branch includes a heat recoverer and is configured to provide warming of the first coolant branch. The first coolant branch can also include a first CCV that is configured to control a temperature of coolant delivered to the DOHX. The first CCV can be configured to variably adjust a cooled coolant flow from a radiator, defining a first exited coolant flow that is configured to mix with a second exited coolant flow of the third coolant branch, defining a mixed coolant flow that is delivered to the DOHX. The first CCV can be configured to receive the cooled coolant flow from the radiator and the exited coolant flow of the third coolant branch. The vehicular thermal management system can further include a fluid terminal that is configured to: i) receive the first exited coolant flow and the second exited coolant flow; and, ii) exit the mixed coolant flow. The second coolant branch can also include a second CCV that is configured to variably adjust coolant flow within the IC engine.

BRIEF DESCRIPTION OF THE DRAWINGS

The foregoing Summary will be best understood when read in conjunction with the appended drawings. In the drawings.

DETAILED DESCRIPTION OF THE EMBODIMENTS

Identically labeled elements appearing in different figures refer to the same elements but may not be referenced in the description for all figures. The exemplification set out herein illustrates at least one embodiment, in at least one form, and such exemplification is not to be construed as limiting the scope of the claims in any manner. Certain terminology is used in the following description for convenience only and is not limiting. The words "inner," "outer," "inwardly," and "outwardly" refer to directions towards and away from the parts referenced in the drawings. Axially refers to directions along a diametric central axis. Radially refers to directions that are perpendicular to the central axis. The words "left", "right", "up", "upward", "down", and "downward" designate directions in the drawings to which reference is made. The words "directly fluidly connected" signify two components that are fluidly connected to each other by a coolant circuit without any components residing between them. The words "arranged between", in a context of where one component is arranged between two other components, is meant to signify an arrangement of three fluidly connected components that may or may not be directly fluidly connected. The terminology includes the words specifically noted above, derivatives thereof, and words of similar import.

Figure 1:
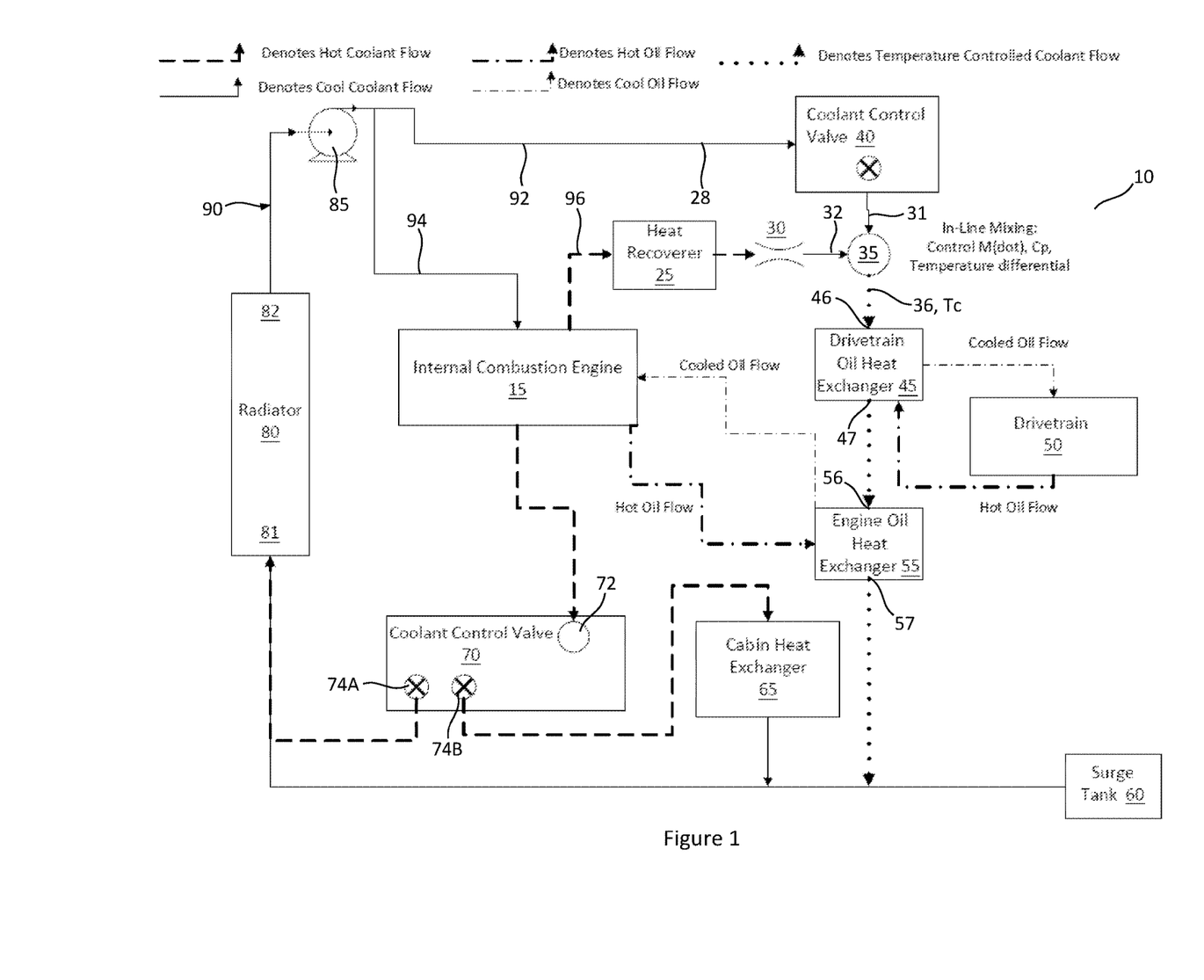
FIG. 1 is a schematic diagram of an example embodiment of a vehicular thermal management system.

In an example embodiment shown in FIG. 1, a vehicular thermal management system 10 is provided that includes an internal combustion (IC) engine 15, a cabin heat exchanger 65, a heat recoverer 25, a coolant pump 85, an engine oil heat exchanger (EOHX) 55, a drivetrain 50, a radiator 80, a drivetrain oil heat exchanger (DOHX) 45, a first coolant control valve (CCV) 40, a second CCV 70, an optional fixed-opening flow adjuster 30, and a coolant circuit 90. The heat recoverer 25 can be an exhaust gas heat exchanger, an integrated exhaust manifold, or any other component or system that extracts useable heat from the IC engine 15. The coolant pump 85 can be an electric coolant pump, a centrifugal coolant pump driven by a power source such as an IC engine, or any other suitable device that facilitates delivery of pressurized coolant through the coolant circuit 90. The term "drivetrain" signifies any component within the drivetrain of a vehicle, including, but not limited to, a transmission, a differential, and a transfer case. Likewise, the term "drivetrain oil heat exchanger" signifies an oil heat exchanger for any component within the drivetrain.

The terms "series" and "parallel" will be used to describe the layout of the vehicular thermal management system 10; these terms are known in the art of coolant systems. "Series" depicts delivery of coolant to components that are arranged sequentially, or one after another. In a series arrangement, a first component that is arranged upstream of a second component will receive a volume of pressurized coolant first, as delivered from a pressurized coolant source, such as the coolant pump 85. The volume of coolant will then flow out of the first component and to the second component. Stated otherwise, in a series arrangement, any coolant that flows into the second component, must first flow through the first component before reaching the second component. "Parallel" depicts an arrangement where components receive coolant independently of each other from a single pressure source. For example, a water circuit for a house has a single source of pressurized water that is delivered to multiple components independently or in parallel, such as a water heater, a washing machine, and a faucet.

The vehicular thermal management system 10 shown in FIG. 1 depicts coolant flow to a first coolant branch 92 or flow path and a second coolant branch 94, with the first coolant branch 92 and the second coolant branch 94 arranged in parallel relative to the coolant pump 85. The first coolant branch 92 provides coolant to the first CCV 40, the DOHX 45 and the EOHX 55, all arranged in series. Additional components may be arranged in the first coolant branch 92 which are not shown in the figures or described herein. The second coolant branch 94 provides coolant to the IC engine 15, the second CCV 70, and the cabin heat exchanger 65, all arranged in series. Additional components may be arranged in the second coolant branch 94 which are not shown in the figures or described herein. A third coolant branch 96 extends or flows from the IC engine 15 and fluidly connects the heat recoverer 25 to the first coolant branch 92 via the fixed-opening flow adjuster 30 that is arranged in series and downstream of the heat recoverer 25. The fixed-opening flow adjuster 30 can be an orifice or any other type of coolant flow resistor. The third coolant branch 96 connects to the first coolant branch 92 via a fluid terminal 35, such as a T-connector or any other suitable connector that merges a first exited coolant flow 31 of the first CCV 40 with a second exited flow 32 of the third coolant branch 96, or alternatively stated, the second exited flow 32 of the heat recoverer 25. It is clear from FIG. 1 that the mixing of the first and second exited coolant flows 31, 32 occurs downstream and outside of the first CCV 40.

Exiting the fluid terminal 35 is a mixed coolant flow 36, defined by the first and second exited coolant flows 31, 32, that flows through the DOHX 45 via a respective inlet 46 and outlet 47 of the DOHX 45. Upon exiting the DOHX 45, the coolant flows through the EOHX 55 via a respective inlet 56 and outlet 57 of the EOHX 55. The EOHX 55 can be directly fluidly connected to the DOHX 45 without any components residing between them.

Figure 7A:
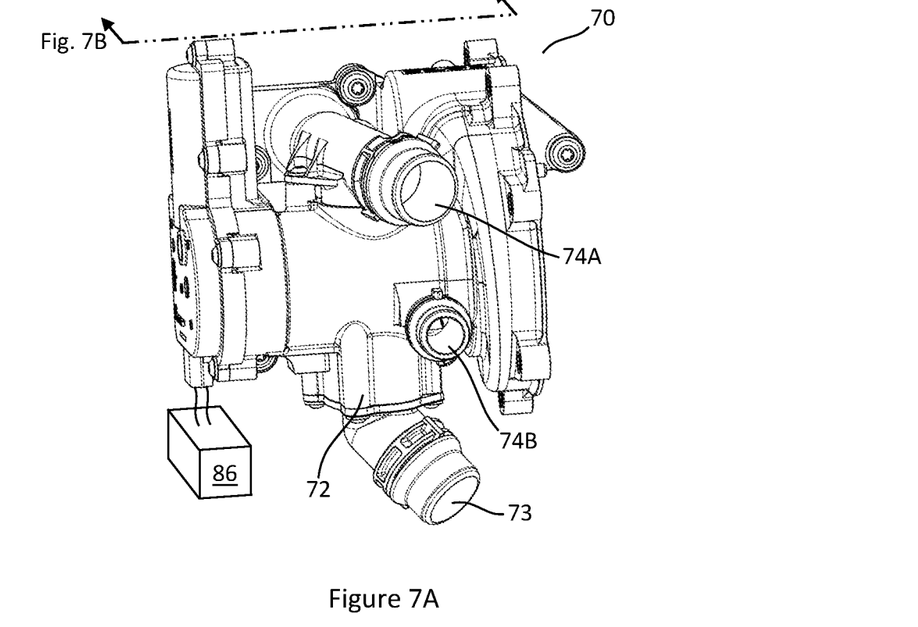
FIG. 7A is a perspective view of an example embodiment of a CCV having a multi-lobed RVB.
Figure 7B:
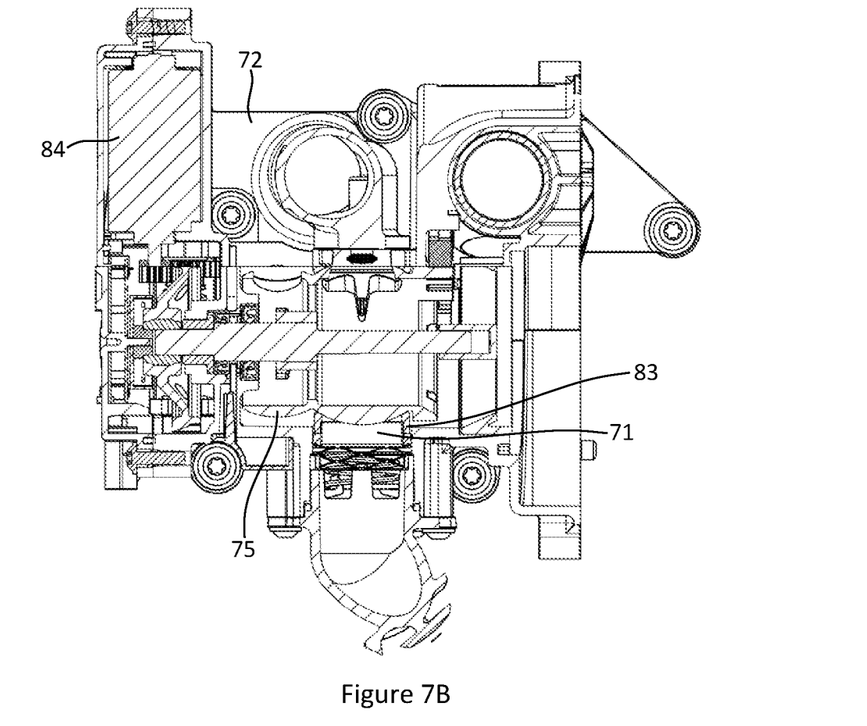
FIG. 7B is a cross-sectional view taken from FIG. 7A that shows the multi-lobed RVB actuated by an actuator.

With reference to the second coolant branch 94 of FIG. 1, coolant flows through the IC engine 15 and to the second CCV 70; the second CCV 70 can control an operating temperature of the IC engine 15 by managing the coolant flow through the IC engine 15. The second CCV 70 is shown with multiple inlets and outlets arranged in a housing, including an inlet 73, a first outlet 74A, and a second outlet 74B; however, any number of inlets and outlets could be possible. As shown, the first outlet 74A is fluidly connected to a hot side 81 of the radiator 80 and the second outlet 74B is fluidly connected to the cabin heat exchanger 65. The second CCV 70 can be of any suitable design that controls coolant flow within a desired number of inlets and outlets. One such example is shown in FIGS. 7A and 7B, which includes a multi-lobe rotary valve body (RVB) 75 that overlaps with fluid ports 71 arranged within a housing 72 to control an amount of coolant flow through the respective inlet 73 and first and second outlets 74A, 74B.

Figure 7C:
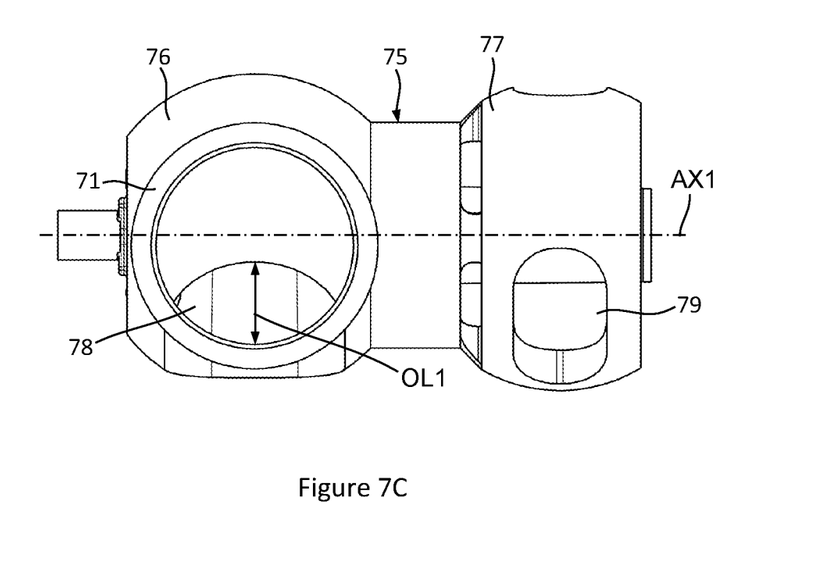
FIG. 7C is a top view of the multi-lobed RVB of FIG. 7B in a first rotational position relative to a coolant port.

FIGS. 7C and 7D show top views of the multi-lobe RVB 75 together with an opening of one of the fluid ports 71 arranged within the housing 72 of the second CCV 70. The multi-lobe RVB 75 includes a first lobe 76 and a second lobe 77 and a rotational axis AX1. The first and second lobes 76, 77 can also be described as truncated spheres or spherical segments that engage with seals 83 (FIG. 7B) arranged within the fluid ports 71 to minimize leakage and provide precise fluid control. The first lobe 76 includes a first fluid opening 78 and the second lobe 77 includes a second fluid opening 79. FIG. 7C shows a first rotational position of the multi-lobe RVB 75 in which the first fluid opening 78 overlaps with the fluid port 71 to achieve a first overlap OL1.

Figure 7D:
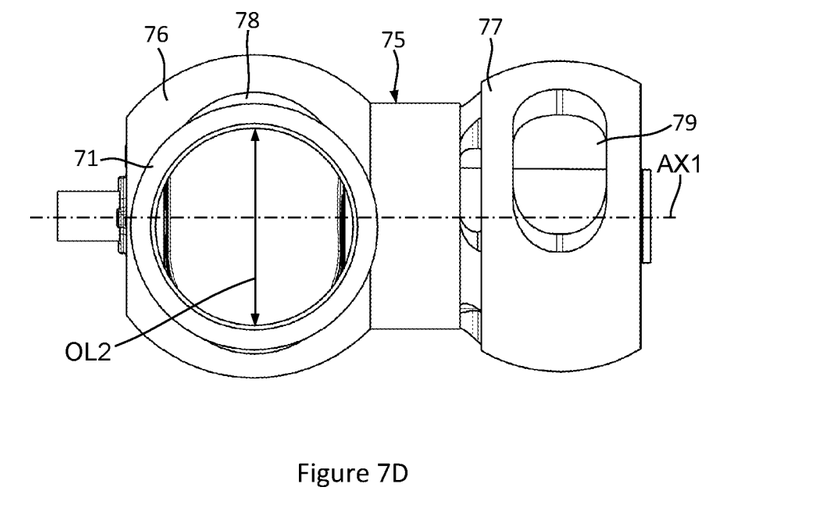
FIG. 7D is a top view of the multi-lobed RVB of FIG. 7C in a second rotational position relative to the coolant port.

FIG. 7D shows a second rotational position of the multi-lobe RVB 75 in which the first fluid opening 78 overlaps with the fluid port 71 to achieve a second overlap OL2. As the second overlap OL2 is larger than the first overlap OL1, the second rotational positional can yield a greater flow of fluid within the fluid port 71, and, subsequently through the inlet or outlet to which it is fluidly connected.

The first and second rotational positions of the multi-lobe RVB 75 are two of many rotational positions that are possible, as the multi-lobe RVB 75 can be rotated and stopped at any rotational position within a continuous range of rotational positions, also termed as being "continuously variable". Such continuous variability of the multi-lobe RVB 75 facilitates a continuously variable overlap between the first fluid opening 78 and the port 71. This function is facilitated by an actuator 84 within the second CCV 70 that is managed by an electronic controller 86 to move the multi-lobe RVB 75 to a desired rotational position.

Figure 5:
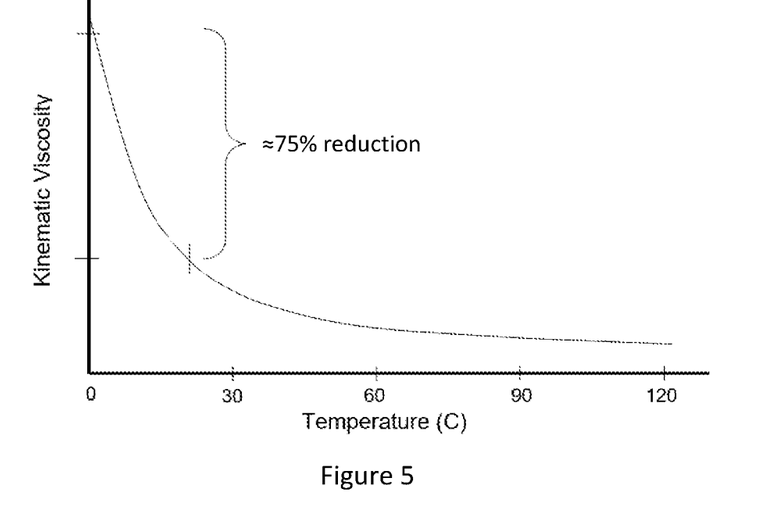
FIG. 5 is a plot of viscosity versus temperature for oil lubricants of an IC engine and a drivetrain.

One of the functions of the vehicular thermal management system 10 is to utilize generated heat within the system, in many instances excess and unwanted heat, to heat lubricating fluids of mechanical systems in order to increase operational efficiency. FIG. 5 shows a kinematic viscosity versus temperature plot that is representative of both drivetrain and engine lubricating fluids. A significant viscosity reduction, in the vicinity of 75%, occurs during an increase in temperature from 0 to 20 degrees Celsius. As kinematic viscosity can significantly impact friction amongst interfacing components that utilize this lubricating fluid, FIG. 5 highlights the importance of fast warm-up times for both the drivetrain and IC engine in order to reduce this friction and subsequently increase efficiency.

Figure 6A:
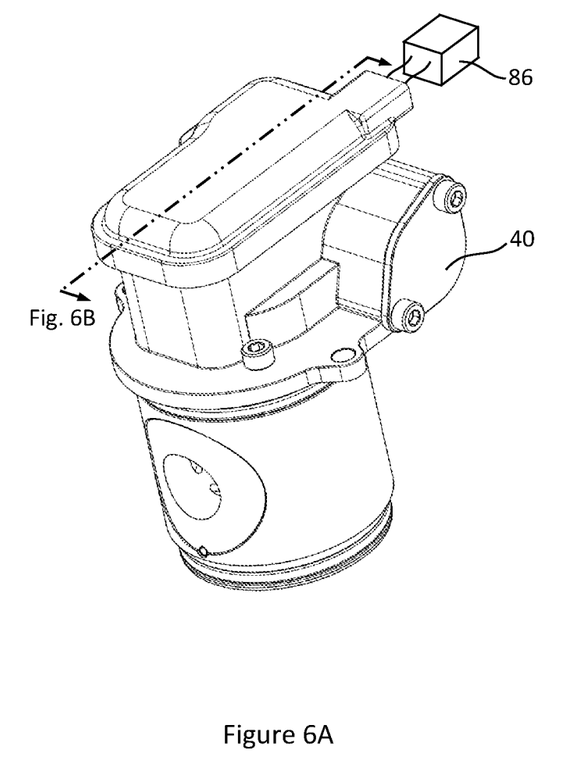
FIG. 6A is a perspective view of an example embodiment of a coolant control valve (CCV) having a single-lobe rotary valve body (RVB).
Figure 6B:
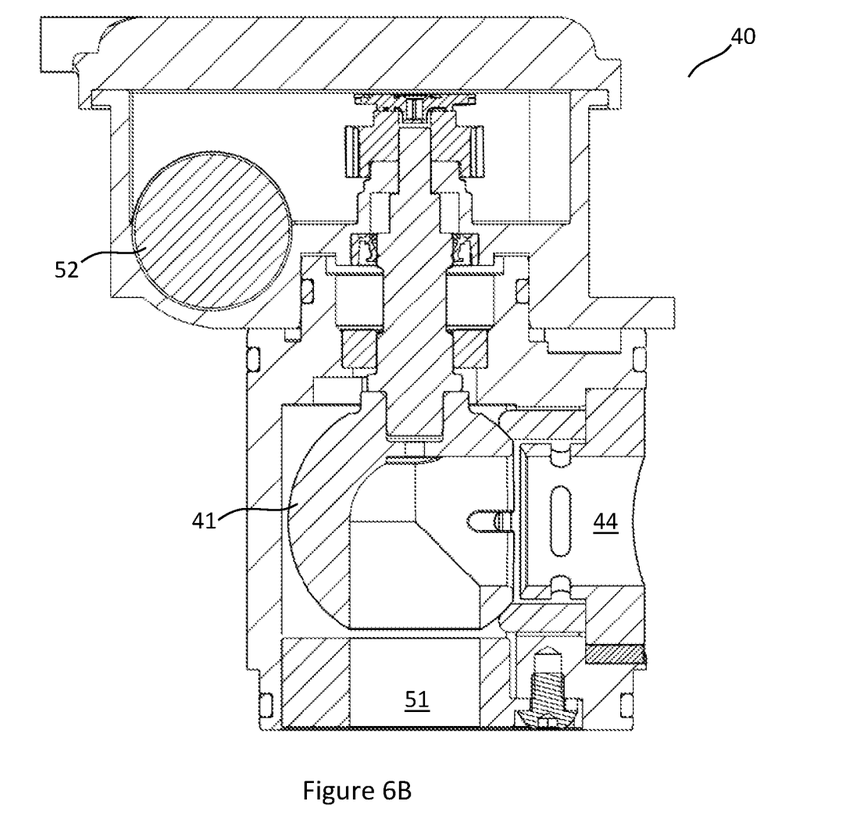
FIG. 6B is a cross-sectional view taken from FIG. 6A that shows the single-lobe RVB actuated by an actuator.
Figure 6C:
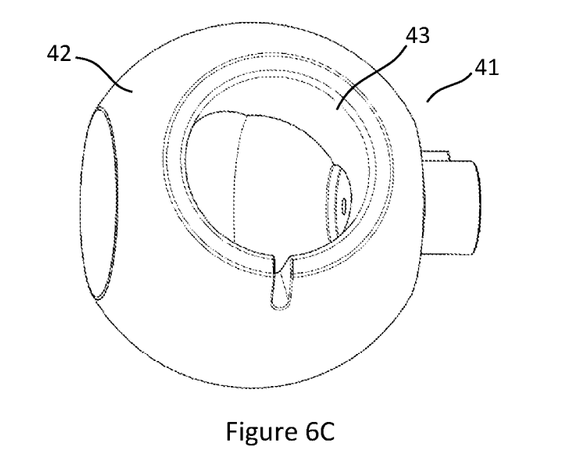
FIG. 6C is a perspective view of the single-lobe RVB shown in FIG. 6B.

In some vehicular thermal management systems, complex CCVs can be required to manage coolant circuits for a DOHX and EOHX arranged in parallel. FIGS. 6A through 6C show one example embodiment of the first CCV 40 of the vehicular thermal management system 10. The first CCV 40 can include a single-lobe RVB 41 that has a lobe 42 with a fluid opening 43. Similar to the previously described multi-lobe RVB 75, the single-lobe RVB 41 can be rotated and stopped at any rotational position within a continuous range of rotational positions to change an overlap between the fluid opening 43 and an inlet port 44 of the first CCV 40. This function is facilitated by an actuator 52 that is managed by the electronic controller 86 to move the single-lobe RVB 41 to a desired rotational position. As shown in FIGS. 6B and 6C, the fluid opening 43 defines a fluid path that turns 90 degrees within the lobe 42, directly connecting the inlet port 44 to an outlet port 51 arranged at an end of the first CCV 40. In the context of the previously described vehicular thermal management system 10, the inlet port 44 receives a cooled coolant flow 28 from a cold side of the radiator 80. Rotation of the single-lobe RVB 41 can vary an overlap between the fluid opening 43 and the inlet port 44 to adjust the incoming cooled coolant flow 28 to a desired rate of the first exited coolant flow 31. Additionally, a "no overlap" condition is also possible between the fluid opening 43 and the inlet port 44 to prevent any flow of cooled coolant to the fluid terminal 35. Other suitable forms of a first CCV 40 are possible, including valves that move from one discrete position to another to achieve different flow positions.

The third coolant branch 96, by fluidly connecting the heat recoverer 25 to the first coolant branch 92, can provide warming or cooling of the coolant that flows to the DOHX 45 and EOHX 55. As previously discussed, the first exited coolant flow 31 of the first CCV 40, which is metered or adjusted by the first CCV 40, mixes with the second exited coolant flow 32 of the third coolant branch 96 and forms the mixed coolant flow 36 that is delivered to the DOHX 45 and EOHX 55 in series. A temperature Tc of the mixed coolant flow 36 can be controlled by the mixing amounts of each of the first exited coolant flow 31 and the second exited coolant flow 32; in particular, the temperature Tc of the mixed coolant flow 36 can be controlled by the first CCV 40 which variably adjusts an amount of cooled coolant flow 28 from a cold side 82 of the radiator 80 and, then delivering this variably adjusted coolant flow or first exited coolant flow 31 to the fluid terminal 35. Assuming a constant amount of "hot" second exited coolant flow 32 from the third coolant branch 96, a higher amount of first exited coolant flow 31 will decrease the temperature Tc of the mixed coolant flow 36; and, a lower amount of first exited coolant flow 31 will increase the temperature Tc of the mixed coolant flow 36. A lower temperature Tc of the mixed coolant flow 36 can be utilized when cooling of the drivetrain oil and the engine oil is desired. A higher temperature Tc of the mixed coolant flow 36 can be utilized when heating of the drivetrain oil and the engine oil is desired. It may be possible for the first CCV 40 to adjust the first exited coolant flow 31 to a zero flow rate.

Figure 8:
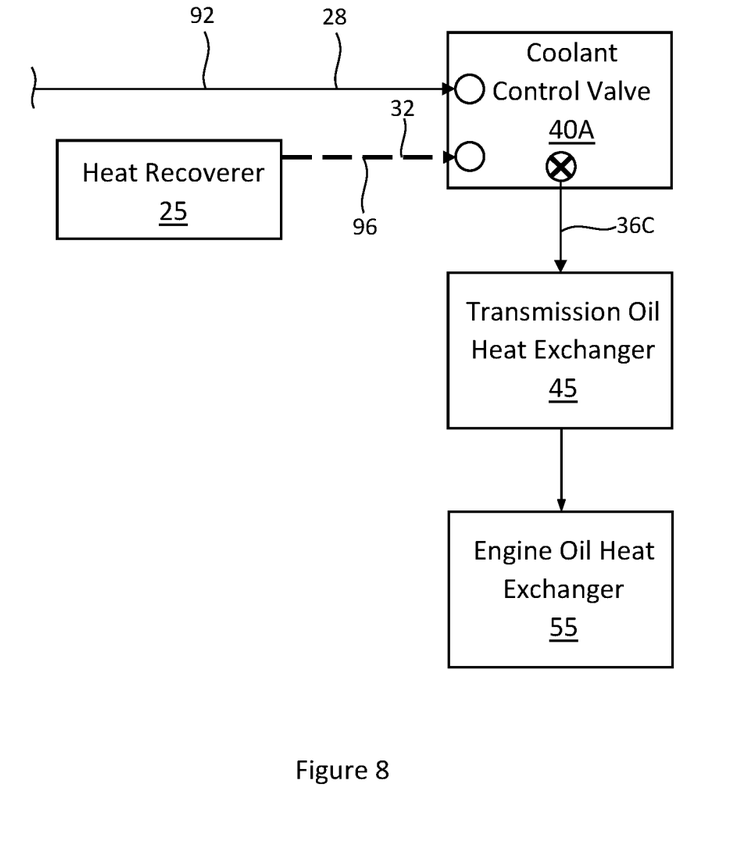
FIG. 8 is a schematic diagram of an example embodiment of a portion of a vehicular thermal management that utilizes a CCV that receives two incoming coolant flows and delivers a mixed coolant flow to a drivetrain oil heat exchanger.

FIG. 8 shows an example embodiment of an alternative arrangement for the vehicular thermal management system 10 of FIG. 1, where a first CCV 40A receives both the second exited coolant flow 32 from the third coolant branch 96 in addition to the previously described cooled coolant 28 from the cold side 82 of the radiator 80. The first CCV 40A can meter each of these flows and mix or merge the flows together to achieve a mixed coolant flow 36C that exits the first CCV 40C. This embodiment of the first CCV 40A can eliminate the previously described fluid terminal 35.

Figure 2:
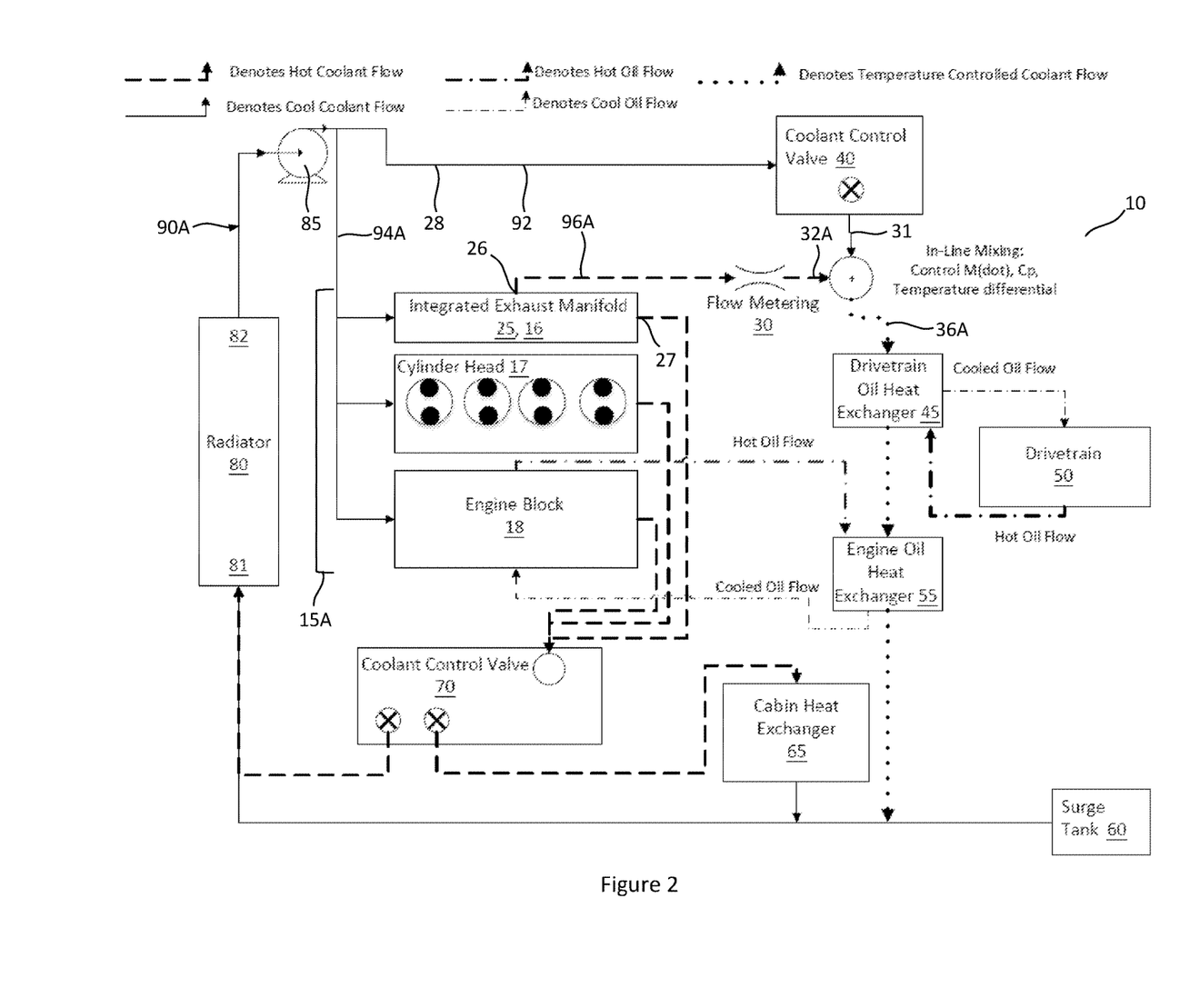
FIG. 2 is a schematic diagram of an example embodiment of a vehicular thermal management system.

FIG. 2 shows another embodiment of a vehicular thermal management system 10A with many of the same components as the embodiment of FIG. 1. The vehicular thermal management system 10A includes a coolant circuit 90A with the first coolant branch 92, a second coolant branch 94A, and a third coolant branch 96A. The second coolant branch includes an IC engine 15A. The IC engine 15A includes an engine block 18 and a cylinder head 17. The cylinder head 17 includes an integrated exhaust manifold (IEM) 16 that serves as the heat recoverer 25. As shown, the IEM 16 receives coolant directly from the coolant pump 85 and exits coolant through a first outlet 26 and a second outlet 27. The first outlet 26 fluidly connects the IEM 16 to the fluid terminal 35, via the fixed-opening flow adjuster 30. The third coolant branch 96A is defined by a portion of the coolant circuit 90 that extends from the first outlet 26 to the fluid terminal 35. The second outlet 27 fluidly connects the IEM 16 to the second CCV 70. As with the vehicular thermal management system 10 of FIG. 1, a portion of coolant flow that exits the cold side 82 of the radiator 80 is metered by the first CCV 40. Hot coolant flowing through the third coolant branch 96A, also defined as a second exited coolant flow 32A, mixes with a metered amount of coolant that exits the cold side 82 of the radiator 80, defined as the first exited coolant flow 31, forming a mixed coolant flow 36A that is provided to the DOHX 45, followed by the EOHX 55.

Figure 4:
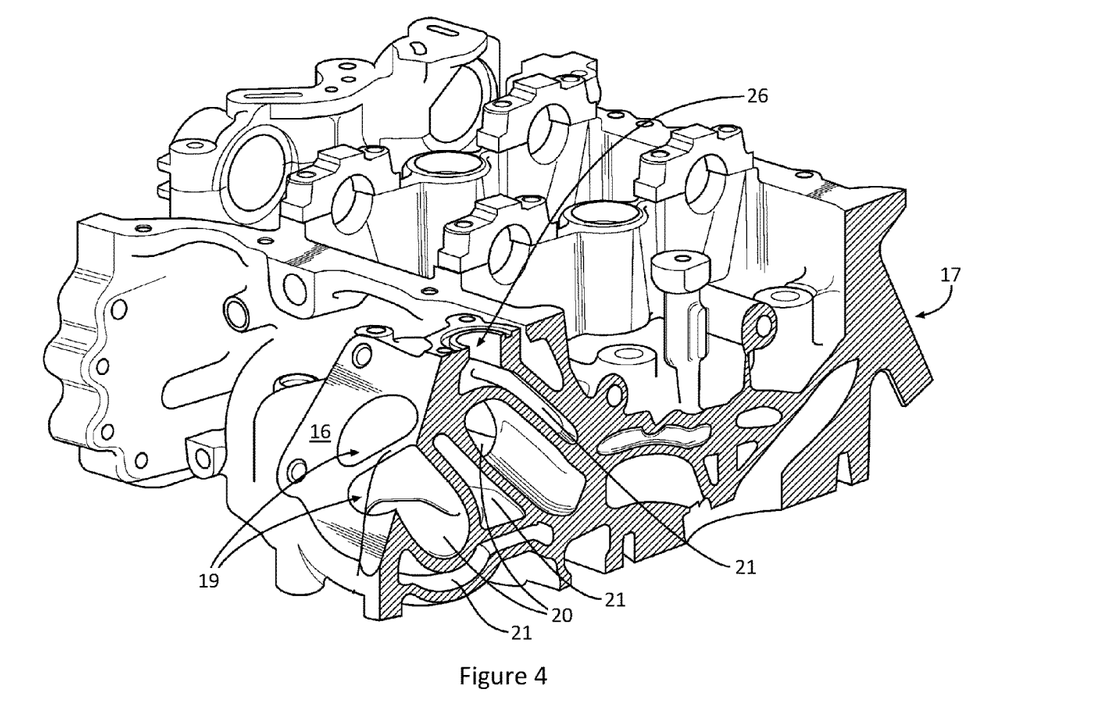
FIG. 4 is a perspective view of an example embodiment of an integrated exhaust manifold within a cylinder head of an internal combustion (IC) engine.

FIG. 4 shows one example embodiment of the IEM 16 that can be utilized for the vehicular thermal management system 10A. The IEM 16 is formed directly within the cylinder head 17 which provides several benefits such as: i) enabling integration of cooling jackets 21 around exhaust gas runners 20 (that terminate at exhaust gas openings 19) which are arranged within the IEM 16; ii) reduced packaging space; and, iii) lower cost. The cooling jackets 21 not only facilitate exhaust gas temperature control and corresponding fuel economy benefits, but also provide a means of transferring extracted unwanted heat to systems or components that can benefit from it.

Figure 3:
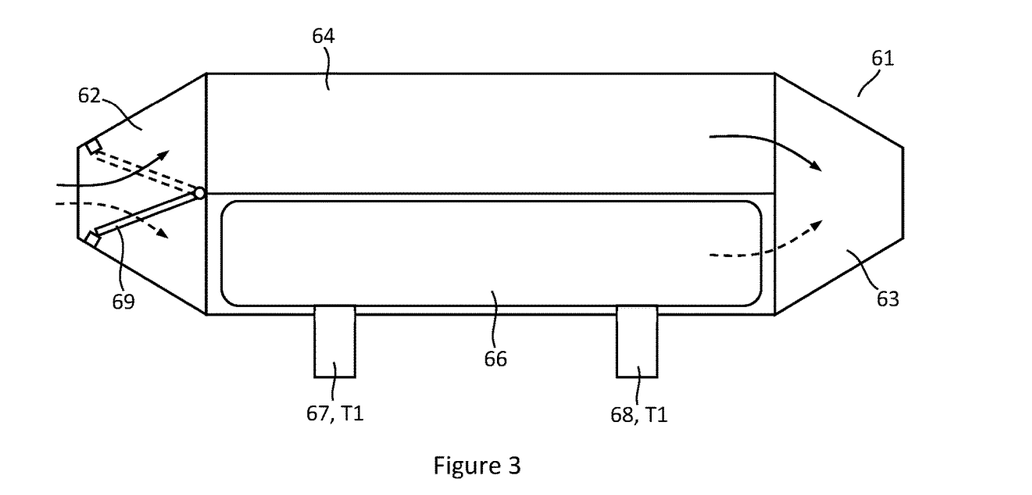
FIG. 3 is a schematic drawing of an exhaust gas heat recoverer.

FIG. 3 shows one example embodiment of an exhaust gas heat recoverer (EGHR) 61 that can serve as the heat recoverer 25. The EGHR 61 includes an exhaust gas inlet 62 and an exhaust gas outlet 63. A pathway of an exhaust gas that enters the exhaust gas inlet 62 is determined by an electronically controlled valve diverter plate 69.

When the valve diverter plate 69 is in an upper position, drawn with broken lines in FIG. 3, an incoming exhaust gas is routed through a heat exchanger 66, defining a first mode of the EGHR 61. This lower pathway is denoted by a downward arrow drawn with a broken line. The heat exchanger includes a coolant inlet 67, at which the incoming coolant has a first temperature T1, and a coolant outlet 68, at which the outgoing coolant has a second temperature T2. As the hot exhaust gas flows through the heat exchanger 66, heat is extracted from the exhaust gas by the coolant that flows through the heat exchanger, therefore, the second temperature T2 of the outlet coolant is greater than the first temperature T1 of the inlet coolant. With reference to FIG. 1, the coolant that flows out of the EGHR 61 via the coolant outlet 68 then flows through the fixed-opening flow adjuster 30 and then to the fluid terminal 35.

When the valve diverter plate 69 is in a lower position, drawn with solid lines in FIG. 3, an incoming exhaust gas is routed through an upper chamber 64, defining a second mode of the EGHR 61. This upper pathway is denoted by an upward arrow drawn with a solid line. In this second mode, no heat is extracted from the incoming exhaust gas, resulting in a minimal or no temperature difference between the incoming and outgoing coolant.

The piping network for the EGHR 61 can be integrated in-line with a primary vehicular exhaust system that includes a catalytic converter, or within a piping network that resides outside of the primary vehicular exhaust system that, for example, provides cooled exhaust gas recirculation to an intake manifold of the IC engine 15, 15A.

A method of operation for the previously discussed vehicular thermal management systems 10, 10A includes:
1). Providing the heat recoverer 25;
2). Flowing coolant to the heat recoverer 25;
3). Mixing an exited coolant flow from the heat recoverer 25 (previously described as a second exited coolant flow 32, 32A) together with an adjusted flow of cooled coolant from the radiator 80 (previously described as a first exited coolant flow 31), forming a mixed coolant flow 36, 36A; and,
4). Delivering the mixed coolant flow 36, 36A sequentially, in series, to: i) the DOHX 45; followed by, ii) the EOHX 55.

The mixing step can be accomplished by the fluid terminal 35 that receives the first exited coolant flow 31 and the second exited coolant flow 32, 32A from the heat recoverer 25. The first CCV 40 can provide the first exited coolant flow 31. In an alternate arrangement, the first CCV 40 can accomplish the mixing step internally by receiving, and, potentially, metering the second exited coolant flow 32, 32A from the heat recoverer 25 together with the received and metered cooled coolant from the radiator 80.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. A vehicular thermal management system, comprising:
a coolant pump;
a first coolant branch having a first coolant control valve, a drivetrain oil heat exchanger, and an engine oil heat exchanger arranged in series;
a second coolant branch having an internal combustion engine and a second coolant control valve arranged in series, the second coolant control valve configured to control a temperature of the internal combustion engine via metering of a coolant flow from the internal combustion engine to a radiator; and,
the first coolant branch and the second coolant branch arranged parallel to each other and relative to the coolant pump;
a third coolant branch having:
a heat recoverer;
a first end extending from a first segment of the second coolant branch, the first segment extending from the coolant pump to the second coolant control valve in a direction of coolant flow; and,
a second end configured to merge with a second segment of the first coolant branch, the second segment extending from the coolant pump to the drivetrain oil heat exchanger in the direction of coolant flow.

2. The vehicular thermal management system of claim 1, wherein the heat recoverer is an integrated exhaust manifold of a cylinder head of the internal combustion engine.

3. The vehicular thermal management system of claim 1, wherein the heat recoverer is an exhaust gas recoverer.

4. The vehicular thermal management system of claim 1, wherein the engine oil heat exchanger is arranged to receive an exiting coolant from the drivetrain oil heat exchanger, the exiting coolant passing through the drivetrain oil heat exchanger before passing through the internal combustion engine.

5. The vehicular thermal management system of claim 1, wherein the drivetrain oil heat exchanger and the engine oil heat exchanger are arranged sequentially in a direction of coolant flow within the first coolant branch.

6. The vehicular thermal management system of claim 1, wherein the first coolant control valve comprises a continuously variable single-lobe rotary valve body.

7. The vehicular thermal management system of claim 1, wherein the second coolant control valve comprises a continuously variable multi-lobe rotary valve body.

8. A vehicular thermal management system, comprising:
a coolant circuit configured to fluidly connect,
an internal combustion engine;

a heat recoverer;
an engine oil heat exchanger;
a drivetrain oil heat exchanger;
a coolant pump; and,
a first coolant control valve arranged in a first segment of the coolant circuit; and,
the first coolant control valve configured to receive and variably adjust a cooled coolant flow from a radiator, defining a first exited coolant flow that, in the first segment of the coolant circuit, mixes with a second exited coolant flow of the heat recoverer, defining a mixed coolant flow that is delivered, without passing through the internal combustion engine, to one of the drivetrain oil heat exchanger to the engine oil heat exchanger within the first segment of the coolant circuit; and,
the list segment extending from the coolant pump to the drivetrain oil heat exchanger in a direction of coolant flow.

9. The vehicular thermal management system of claim 8, further comprising a second coolant control valve configured to variably adjust coolant flow within the internal combustion engine, the second coolant control valve arranged in series with the internal combustion engine.

10. The vehicular thermal management system of claim 9, wherein the first coolant control valve, drivetrain oil heat exchanger, and the engine oil heat exchanger are arranged in series, forming a first coolant branch.

11. The vehicular thermal management system of claim 9, wherein the internal combustion and the second coolant control valve form a second coolant branch, and the first coolant branch and the second coolant branch are arranged in parallel relative to each other and the coolant pump.

12. A vehicular thermal management system, comprising:
a coolant circuit having:
    a first coolant branch including a first coolant control valve, a drivetrain oil heat exchanger, and an engine oil heat exchanger arranged in series;
    a second coolant branch including an internal combustion engine; and,
    a third coolant branch including a heat recoverer, the third coolant branch configured to provide warming of the first coolant branch; and
the first coolant control valve is configured to control a temperature of a mixed coolant flow delivered to the drivetrain oil heat exchanger by variably adjusting a cooled coolant flow from a radiator, defining a first exited coolant flow, and
the first exited coolant flow is configured to mix with a second exited coolant flow of the second coolant branch, defining the mixed coolant flow.

13. The vehicular thermal management system of claim 12, wherein the second coolant branch further comprises a second coolant control valve configured to variably adjust coolant flow within the internal combustion engine.

14. The vehicular thermal management system of claim 12, wherein the first coolant control valve is configured to receive the second exited coolant flow of the second coolant branch and exit the mixed coolant flow.

15. The vehicular thermal management system of claim 12, further comprising a fluid terminal configured to: i) receive the first exited coolant flow and the second exited coolant flow, and, ii) exit the mixed coolant flow.

16. The vehicular thermal management system of claim 8, wherein the first coolant control valve is configured to receive the second exited coolant flow and exit the mixed coolant flow.

17. The vehicular thermal management system of claim 8, further comprising a fluid terminal arranged downstream and in series with the first coolant control valve, the fluid terminal configured to: i) receive the first exited coolant flow and the second exited coolant flow, and ii) exit the mixed coolant flow.

18. The vehicular thermal management system of claim 12, wherein the drivetrain oil heat exchanger is arranged upstream of the engine oil heat exchanger.

\* \* \* \* \*